(12) United States Patent
Andreoli-Fang et al.

(10) Patent No.: US 11,064,393 B2
(45) Date of Patent: Jul. 13, 2021

(54) SYSTEMS AND METHODS FOR EXPEDITED SESSION SETUP OF A WIRELESS SESSION

(71) Applicant: Cable Television Laboratories, Inc., Louisville, CO (US)

(72) Inventors: Jennifer Andreoli-Fang, Boulder, CO (US); Bernard McKibben, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 15/454,668

(22) Filed: Mar. 9, 2017

(65) Prior Publication Data
US 2017/0265206 A1 Sep. 14, 2017

Related U.S. Application Data

(60) Provisional application No. 62/357,770, filed on Jul. 1, 2016, provisional application No. 62/345,634, filed on Jun. 3, 2016, provisional application No. 62/353,755, filed on Jun. 23, 2016, provisional application No. 62/339,463, filed on May 20, 2016,
(Continued)

(51) Int. Cl.
| | | |
|---|---|---|
| *H04W 28/20* | (2009.01) | |
| *H04W 28/02* | (2009.01) | |
| *H04W 72/12* | (2009.01) | |
| *H04W 72/10* | (2009.01) | |
| *H04W 76/14* | (2018.01) | |
| *H04W 72/08* | (2009.01) | |
| *H04W 84/12* | (2009.01) | |
| *H04W 28/24* | (2009.01) | |
| *H04W 84/04* | (2009.01) | |

(52) U.S. Cl.
CPC ....... *H04W 28/20* (2013.01); *H04W 28/0268* (2013.01); *H04W 28/0278* (2013.01); *H04W 72/085* (2013.01); *H04W 72/10* (2013.01); *H04W 72/1268* (2013.01); *H04W 76/14* (2018.02); *H04W 28/24* (2013.01); *H04W 84/042* (2013.01); *H04W 84/12* (2013.01)

(58) Field of Classification Search
CPC .. H04W 72/085; H04W 76/14; H04W 76/023
See application file for complete search history.

(56) References Cited

U.S. PATENT DOCUMENTS

| | | |
|---|---|---|
| 6,157,614 A | 12/2000 | Pasternak et al. |
| 7,899,451 B2 | 3/2011 | Hu et al. |
| (Continued) | | |

OTHER PUBLICATIONS

International Search Report in PCT/US17/21918, dated Aug. 16, 2017.

*Primary Examiner* — Jae Y Lee
(74) *Attorney, Agent, or Firm* — David Daniel Smith; Cable Television Laboratories, Inc.

(57) ABSTRACT

Systems and methods presented herein provide for expediting a setup of a wireless session. In one embodiment, a method comprises intercepting setup information for a wireless session from a mobile core (e.g., operated by an MNO) servicing the UE, initiating a communication session between a Modem Termination System (MTS) and a modem based on the intercepted setup information to support a forthcoming wireless session, and providing the wireless session through the communication session setup.

26 Claims, 7 Drawing Sheets

Related U.S. Application Data provisional application No. 62/306,360, filed on Mar. 10, 2016.

(56) References Cited

U.S. PATENT DOCUMENTS

| | | |
|---|---|---|
| 8,867,490 B1 | 10/2014 | Krishna et al. |
| 8,897,312 B2 | 11/2014 | Pesola |
| 9,754,454 B2 | 9/2017 | Onorato et al. |
| 2005/0159162 A1 | 7/2005 | Park |
| 2008/0020797 A1 | 1/2008 | Denney et al. |
| 2009/0156213 A1 | 6/2009 | Spinelli et al. |
| 2009/0304055 A1 | 12/2009 | Nino et al. |
| 2010/0118752 A1 | 5/2010 | Suzuki et al. |
| 2010/0172368 A1 | 7/2010 | Eng |
| 2010/0284314 A1 | 11/2010 | Pelletier et al. |
| 2012/0287784 A1* | 11/2012 | Shatzkamer .......... H04W 28/26 370/230.1 |
| 2012/0321312 A1 | 12/2012 | Timm et al. |
| 2013/0010686 A1* | 1/2013 | Shatzkamer .......... H04W 40/00 370/328 |
| 2013/0142157 A1 | 6/2013 | Pesola |
| 2014/0056130 A1* | 2/2014 | Grayson ................ H04W 76/12 370/230 |
| 2014/0328190 A1 | 11/2014 | Lord et al. |
| 2015/0358838 A1 | 12/2015 | Wei et al. |
| 2016/0262169 A1 | 9/2016 | Das et al. |
| 2017/0244539 A1 | 8/2017 | Hanna et al. |
| 2017/0280467 A1 | 9/2017 | Zhu et al. |
| 2017/0330408 A1 | 11/2017 | Onorato et al. |

\* cited by examiner

SYSTEMS AND METHODS FOR EXPEDITED SESSION SETUP OF A WIRELESS SESSION

CROSS REFERENCE TO RELATED APPLICATIONS

This patent application claims priority to, and thus the benefit of an earlier filing date from, U.S. Provisional Patent Application Nos. 62/357,770 (filed Jul. 1, 2016), 62/345,634 (filed Jun. 3, 2016), 62/353,755 (filed Jun. 3, 2016), 62/339,463 (filed May 20, 2016), 62/306,360 (filed Mar. 10, 2016), the entire contents of each of which are hereby incorporated by reference.

BACKGROUND

Mobile Network Operators (MNOs) operate a mobile core to provide wireless service to a variety of wireless user equipment (UEs, such as cell phones, laptop computers, tablet computers, etc.). The wireless networks of these MNOs exist in a variety of forms and operate using a variety of modulations, signaling techniques, and protocols, such as those found in Wi-Fi, 3G, 4G, 5G and Long Term Evolution (LTE) networks. Some MNOs even operate with Multiple-System Operators (MSOs), Telecommunications Companies (telcos), satellite operators (including high speed satellite broadband services), fiber operators, and UAV internet providers, collectively referred to as "Operators". For example, Operators routinely provide internet services to the MNOs for backhaul traffic, while the MNO provides wireless services for the Operator. In addition, some Operators operate both the wired services and MNO services.

Now, Operators are even providing "small cells" such that a UE can communicate through its MNO via the Operator. For example, an MSO may deploy an antenna/interface that a UE can communicate with via its respective wireless protocol. The MSO packages the communications between the UE and the MNO's mobile core via the MSO's protocol, for example Data Over Cable Service Interface Specification (DOCSIS). However, inefficiencies in the communication session setups of the Operator and the MNO create latencies that negatively affect the user's Quality of Experience (QoE).

SUMMARY

Systems and methods presented herein provide for expediting the setup of a wireless service through a request-grant based communication link, for example, a DOCSIS communication link. In one embodiment, a method comprises intercepting setup information for a wireless session from a mobile core (e.g., operated by an MNO) servicing the UE, initiating a communication session between a Modem Termination System (MTS) and a modem based on the intercepted setup information to support a forthcoming wireless session, and providing the wireless session through the communication session setup.

Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of backhauling traffic, for example, a satellite operator's communication system. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

In an embodiment, the UE is an LTE wireless device, although it will be understood that the present invention is equally applicable for use with 2G, 3G, 5G, Wi-Fi and other wireless protocol systems.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below. For example, the following description is discussed as applied to an LTE-DOCSIS cooperative network for expediting the setup of a wireless service through a request-grant based communication link between a user device and a wireless core. It will be appreciated that the present latency reduction in the wireless service system and method may equally be applied in systems utilizing macrocells, Wi-Fi, satellite communication systems, optical backhaul systems (EPON, GPON, RFOG), MU-MIMO, laser communication, and even aerial vehicles such as unmanned aerial vehicles (UAV) and balloons that provide wireless and/or laser communication. That is, the present invention may be used in many wireless-to-backhaul systems where at least one of the wireless system or backhaul system utilizes a request-grant protocol for data transmission.

Figure 1:
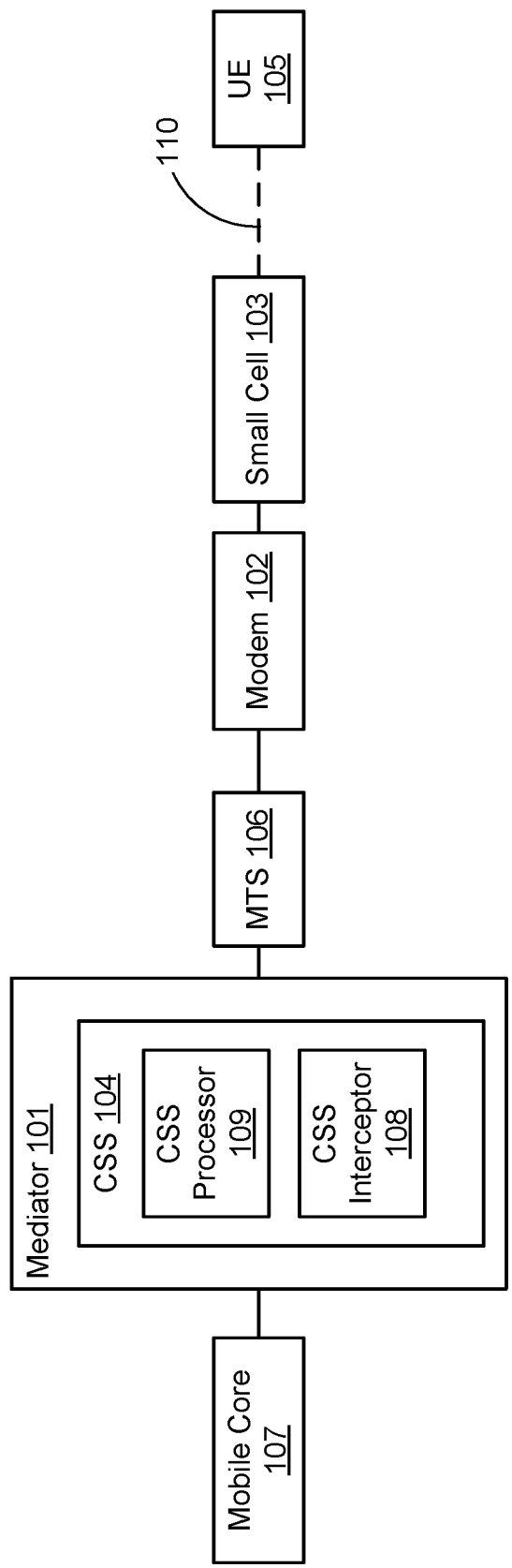
FIG. 1 is a block diagram of an exemplary wireless service link through an MTS.

FIG. 1 is a block diagram of an exemplary wireless service link. The wireless service link may include a mediator 101 in communication with an MTS 106. It will be understood that mediator 101 may be integrated with or communicatively coupled with MTS 106. The MTS 106 may be, for example, a CMTS, a Fiber Node, a Fiber Hub, an optical network unit (ONU), or other termination device. Mediator 101 may be implemented, for example, as a software agent in any of such devices. If mediator 101 is integrated with an MTS, integration may be via software or hardware.

A UE 105 may wirelessly communicate with other UEs (not shown) in a wireless service network for the purpose of transmitting and/or receiving data. A mobile core 107 (e.g., operated by an MNO) controls the operations of the UE 105 within the wireless network. This includes, among other things, managing subscription information (e.g., data communication, data plans, roaming, international calling, etc.) and ensuring that the UE 105 can initiate or receive data sessions and transmit data within the wireless network.

Mediator 101 is implemented with a Communication Session System (CSS) 104 having a CSS interceptor 108 and a CSS processor. Mediator 101, via CSS 104, is operable to intercept and process messages, such as but not limited to LTE messages, between UE 105 and mobile core 107. CSS interceptor 108 is operable to intercept a request for a wireless session between UE 105 and the mobile core 107 servicing UE 105. In an embodiment, CSS processor 109 processes CSS interceptor 108 intercepted setup information from the mobile core 107, which is generated in response to the request. Based on the intercepted setup information CSS processor 109 initiates a backhaul communication session (also called a "communication session" herein) between the modem 102 and the MTS 106 to deliver the wireless session through the communication session. CSS processor 109 initiates the communication session prior to, during, or close in time to when the wireless session is set-up such that the set-up process time, that of both the communication session and the wireless session, is reduced. In one embodiment, the set-up of the backhaul communication session and the wireless session occur at least partially in parallel, thereby reducing the set-up process time.

The CSS 104 may process the intercepted message and generate or otherwise provide data to MTS 106 such that MTS 106 may establish a communication session and a Quality of Service for the communication session between itself and the modem 102. This may be done prior to, in parallel to, or close in time to the establishment of a wireless session by the mobile core 107 with UE 105, see below for more details. One or more of the components of the mediator 101 and CSS 104 may be integrated or in communication with the MTS 106 via hardware, software, or combinations thereof.

In the past, MNOs often maintained, operated, and controlled wireless base stations themselves for the purposes of providing communications with UEs. For example, an MNO employing LTE communications may operate a plurality of eNodeBs in an area to provide wireless services to subscribing UEs in that area.

Now operators are capable of acting as backhaul operators. For example, MSOs are seeking to increase their value to the MNOs by providing alternative backhaul paths for communication between UEs, such as UE 105, and the mobile core, such as mobile core 107. MSOs and wireless operators currently employ wireless devices, a non-limiting example of which is small cell 103, for capturing a wireless data transmission and passing it through a backhaul system, such as that shown in FIG. 1. In the embodiment of FIG. 1, the backhaul system includes modem 102, MTS 106, and optionally meditator 101. The small cell 103 comprises many of the features of a larger base station such as the air-to-air interface and protocol handling. In some instances, the small cell 103 may be a multi-radio hotspot providing for Wi-Fi, as well as LTE Licensed Assisted Access (LTE-LAA) or LTE Unlicensed (LTE-U).

In an alternative embodiment communication is Wi-Fi communication and is between a STA (not shown) a Wi-Fi core (not shown). To modify the system of FIG. 1 to accommodate the Wi-Fi embodiment the skilled artisan would replace small cell 103 with a Wi-Fi station (STA) and the mobile core 107 with a Wi-Fi core.

Small cells and similar wireless technologies (collectively discussed and represented herein as small cells) represent new opportunities for MNOs. These new small cells allow operators to use existing spectrum more efficiently, and promote greater deployment flexibility, all at a lower cost. Small cells also reduce radio access network build-out while improving the end user experience by providing increased access to mobile networks. Additionally, because small cells are much smaller, they can reduce a base station's footprint and have less environmental impact (e.g., in terms of power consumption).

The MSOs and MNOs, evolving from different technologies, generally employ different communication protocols and offer little insight to each other. For example, the MSOs may employ the DOCSIS protocol to transport data to and from the modem 102. The MNOs, on the other hand, may employ a variety of wireless protocols including EDGE (Enhanced Data rates for GSM Evolution), 2G, 3G, 4G, 5G, LTE, or the like. While the MTS 106 and the modem 102 may be able to transport the wireless service traffic of the UE 105 and the mobile core 107, the MTS 106 and the modem 102 need not process the data transmitted. Rather, the MTS 106 and the modem 102 may simply route the traffic between the appropriate parties. In the example of FIG. 1, traffic is routed between UE 105 and mobile core 107 via small cell 103, modem 102, and MTS 106.

When a UE or a mobile core wants to establish a communication session with the other, the UE, small cell and mobile core exchange data sessions establishment with control signaling that includes QoS parameters. The QoS parameters describe a service quality for the data transmitted over the impending wireless session. To transport the wireless traffic of the UE 105 and the mobile core 107, the MTS 106 and the modem 102 need to establish a communication session that allows a wireless session between the UE 105 and the mobile core 107 to occur. To ensure Quality of Experience (QoE) for the end user that consume the wireless session, the backhaul link between the MTS 106 and the modem 102 should have matching or similar QoS provisions as the QoS requirements exchanged between the UE 105 and mobile core 107.

However, the QoS information contained in the LTE signaling is unknown by the backhaul system. Since the MTS 106 and the modem 102 are unaware of the underlying wireless traffic, the MTS 106 and the modem 102 do not know when a wireless session is being established. So, the MTS 106 and the modem 102 cannot understand what types of Quality of Service (QoS) need to be employed. For example, in LTE, the mobile core 107 may need to establish QoS parameters for the UE 105 based on the subscription information of the UE 105 and the type of media being requested by the application in use by the UE 105. LTE identifies QoS with a QoS Class Identifier (QCI), and can employ traffic prioritization such as Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, or some combination thereof.

This lack of insight by the backhaul system into the wireless session setup process and the associated QoS requirement for the session, affects the ability of the backhaul system to provide adequate QoS on the communication link between the modem 102 and the MTS 106. In case of high priority high bandwidth applications such as live video streaming, the MTS 106 is not aware of the QoS requirements needed to transport the data between itself and the modem 102. Thus, some blocks of data may be delayed such that they may no longer be relevant to the video and are therefore dropped. When this occurs regularly, the quality of a live streaming video and the user's quality of experience (QoE) are degraded significantly.

Now, even if the MTS 106 becomes aware of the QoS requirement for the session requested by either the UE 105, or the mobile core 107, the time it takes to set up adequate QoS provisions between the MTS 106 and the modem 102 adds latency to the existing wireless session setup process. Consequently, the end user's wireless session start time is delayed due to the serial setup processes (e.g., due to serial setup procedure of LTE and DOCSIS sessions), and the user's QoE is still affected.

The present embodiments provide for the backhaul QoS signaling (e.g., via a DOCSIS protocol) to be completed in parallel with the wireless session establishment (e.g., LTE wireless session establishment). The present embodiments therefore enable the backhaul system to become aware of the QoS requirement for the wireless traffic such that they provide for the provisioning of the wireless session(s) accordingly, as well as enables the provisioning process to occur without added latency.

In this embodiment, the MTS 106 is configured to identify the various aspects of the wireless session. For example, the MTS 106 may include a mediator 101 comprising functionality of a gateway. In this regard, the MTS 106 can intercept a request from the UE 105 (e.g., via the CSS 104) that indicates whether the UE 105 needs to establish a session to transfer data to the mobile core 107. This may direct the MTS 106 to initiate the establishment of a communication session between the MTS 106 and the modem 102.

Alternatively or additionally, the MTS 106 may be configured with functionality of the mobile core 107 to decode and interpret LTE messages. For example, in a DOCSIS protocol embodiment, the MTS 106 is a CMTS, and may include functionality of an LTE gateway that is operable to intercept a session establishment request from the UE 105 indicating that it needs to start a wireless session to the mobile core 107. This may direct the MTS 106 to initiate the establishment of a communication session between the MTS 106 and the modem 102.

The MTS 106, mediator 101, and/or CSS 104 may also intercept a response to the request from the mobile core 107 (e.g., via mediator 101 or CSS 104). For example, when the mobile core 107 receives a request from the UE 105, the mobile core 107 establishes the requested wireless session between the mobile core 107 and the UE 105. This may include establishing the parameters of the QoS for the wireless session. The MTS 106 may intercept this information and initiate the setup of the communication session between the MTS 106 and the modem 102 using those QoS parameters for the wireless session to ensure that the user of the UE 105 has an acceptable QoE. The MTS 106 and the modem 102 work together to ensure that the QoS of the transport properly matches or supports the QoS of the wireless session. The MTS 106 and the modem 102 do so without unnecessarily consuming or reserving too many network resources. The operator determines how the QoS mechanism is applied to support the QoS Class Identifiers (QCIs), and configures these policy rules into the gateway, allowing the operator to optimize resources for QoS on their network.

Alternatively or additionally, the mobile core 107 may communicate out of band signaling (OOB) indicating that a wireless session between the mobile core 107 and the UE 105 is to be established. The MTS 106, mediator 101, and/or CSS 104 are operable to detect that signaling and initiate or participate in the establishment of a communication session between the MTS 106 and modem 102 to accommodate the wireless session.

Because the MTS 106, mediator 101, and/or CSS 104 intercepts the wireless session set-up data during the initiation of the wireless session, the communication session with the needed QoS can be established in parallel or at least partially in parallel to the wireless session rather than in series. For example, some operators may use DOCSIS network for backhauling traffic of the mobile core 107. DOCSIS and radio networks, such as LTE, have separate scheduling algorithms that result in longer communication latencies. That is, a radio network schedules traffic from the UE 105 differently than an MTS, such as an CMTS, schedules traffic from the modem 102. This often results in the mobile core 107 needing to wait until the DOCSIS network completes a session establishment before the proper QoS session establishment can be completed. These embodiments overcome that by allowing the MTS 106 to establish the communication session with the modem 102 substantially in parallel with the mobile core 107 establishing the wireless session with the UE 105.

Based on the foregoing, the UE 105 is any device, system, software, or combination thereof operable to communicate wirelessly with a wireless network using any one or more wireless protocols including, 2G, 3G, 4G, 5G, LTE, LTE-U, LTE-LAA, or the like, as well as with a Wi-Fi network using any one or more wireless service protocols including 802.11ax. Examples of the UE 105 include, but are not limited to, laptop computers, tablet computers, and wireless telephones such as smart phones. The small cell 103 is any device, system, software, or combination thereof operable to provide an air-to-air interface 110 for the mobile core 107, one example of which is a Wi-Fi core. Examples of the small cell 103 include Wi-Fi access points and base stations operating as eNodeBs in a wireless network. The modem 102 is any device, system, software, or combination thereof operable to provide data transfers with an MTS. Examples of the modem 102 include DOCSIS enabled set-top boxes, an Optical Network Unit or fiber optic modem, and a satellite modem. The MTS 106 is any device, system, software, or combination thereof operable to communicate with the modem 102 as well as provide a wireless service session through the communication link provided by the modem 102 and the MTS 106.

Again, the CSS 104 and its components may implement the functionality for establishing the communication session setup stated herein. The CSS 104 may be any device, system, software, or combination thereof operable with or in the mediator 101 and/or the MTS 106 to implement said functionality. Other exemplary embodiments are shown and described below.

Figure 2:
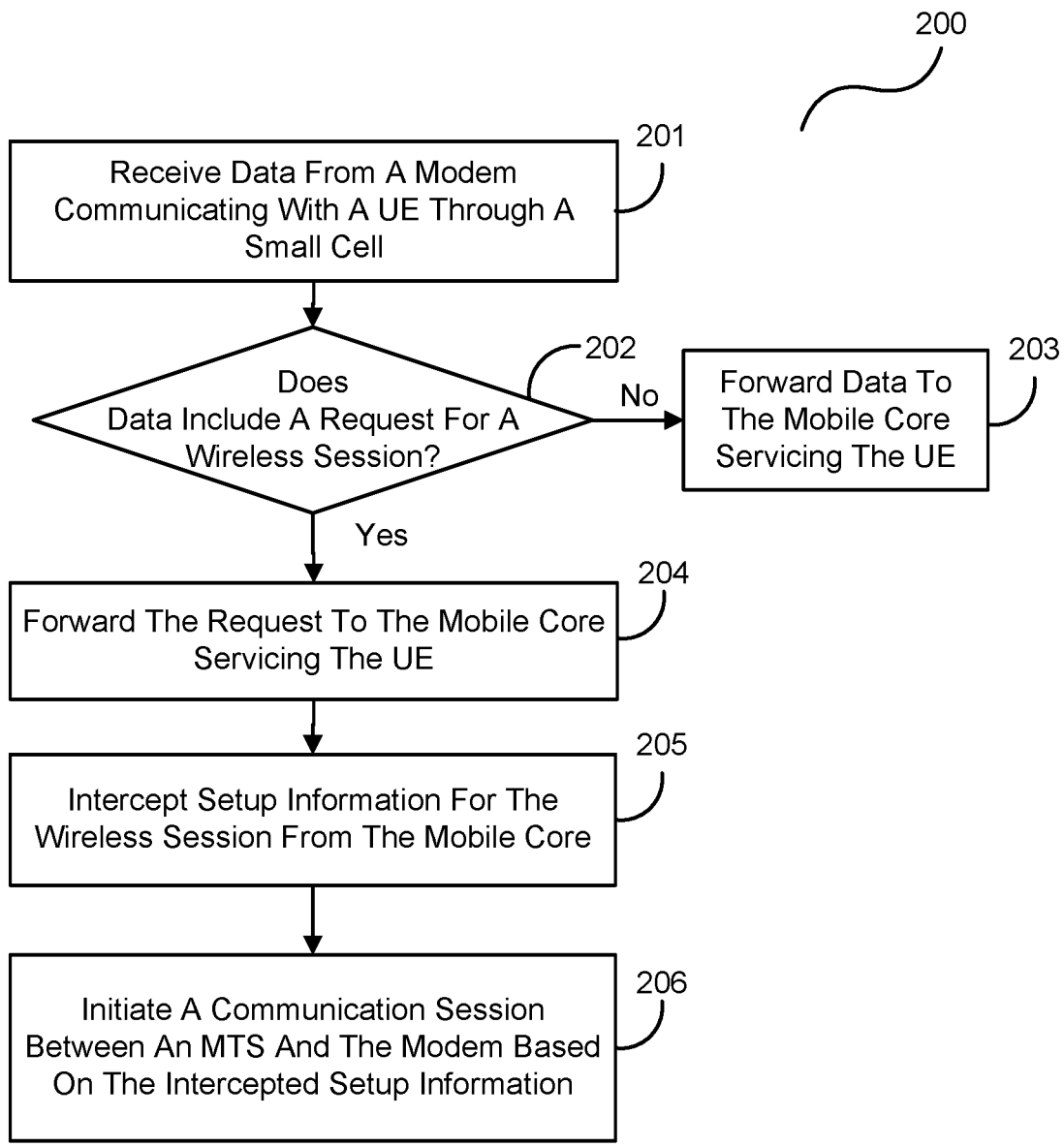
FIG. 2 is a flowchart illustrating an exemplary process operable with the MTS of FIG. 1.

FIG. 2 is a flowchart illustrating an exemplary process 200 operable with the MTS 106 of FIG. 1. In this embodiment, the small cell 103 communicates with the UE 105 over the air-to-air interface 110 and forwards any UE data to the modem 102. The modem 102 may forward the data to the MTS 106. The CSS 104 receives the data, in the process element 201, and determines whether the data includes a request for a wireless session, in the process element 202. For example, the CSS 104 may evaluate all or a portion of the data from the UE 105 and determine whether the UE 105 is transmitting a request to the mobile core 107 such that the mobile core 107 can establish a wireless session with UE 105. Optionally mediator 101, which in is communication with MTS 106, determines whether the data includes a request for a wireless session.

If it is determined in process element 202, the data from the UE 105 does not contain such a request, the CSS 104 simply forwards the data to the mobile core 107 servicing the UE 105, in the process element 203, and process 200 ends. If it is determined in process element 202, the data from the UE 105 does include a request to establish a wireless session, then the CSS 104 forwards, or is optionally instructed by the mediator 101 to forward, the request to the mobile core 107, in the process element 204. In an embodiment, the CSS 104 may inspect traffic from the mobile core 107 intended for the UE 105. In this regard, the CSS 104 may intercept setup information for wireless session from the mobile core 107, in the process element 205.

The CSS 104 propagates the setup information to the modem 102 such that it may forward the setup information to the small cell 103 and to the UE 105 over the air-to air-interface 110. This allows the mobile core 107 to setup a wireless session with the UE 105. As the CSS 104 has determined that the mobile core 107 is setting up the wireless session with UE 105, the CSS 104 initiates a communication session between the MTS 106 and the modem 102 based on the intercepted setup information, in the process element 206. Thus, the MTS 106 sets up its communication session with the modem 102 while the mobile core 107 is setting up its wireless session with the UE 105, thereby reducing latencies associated with the differences between the wireless and wireline protocols.

Figure 3:
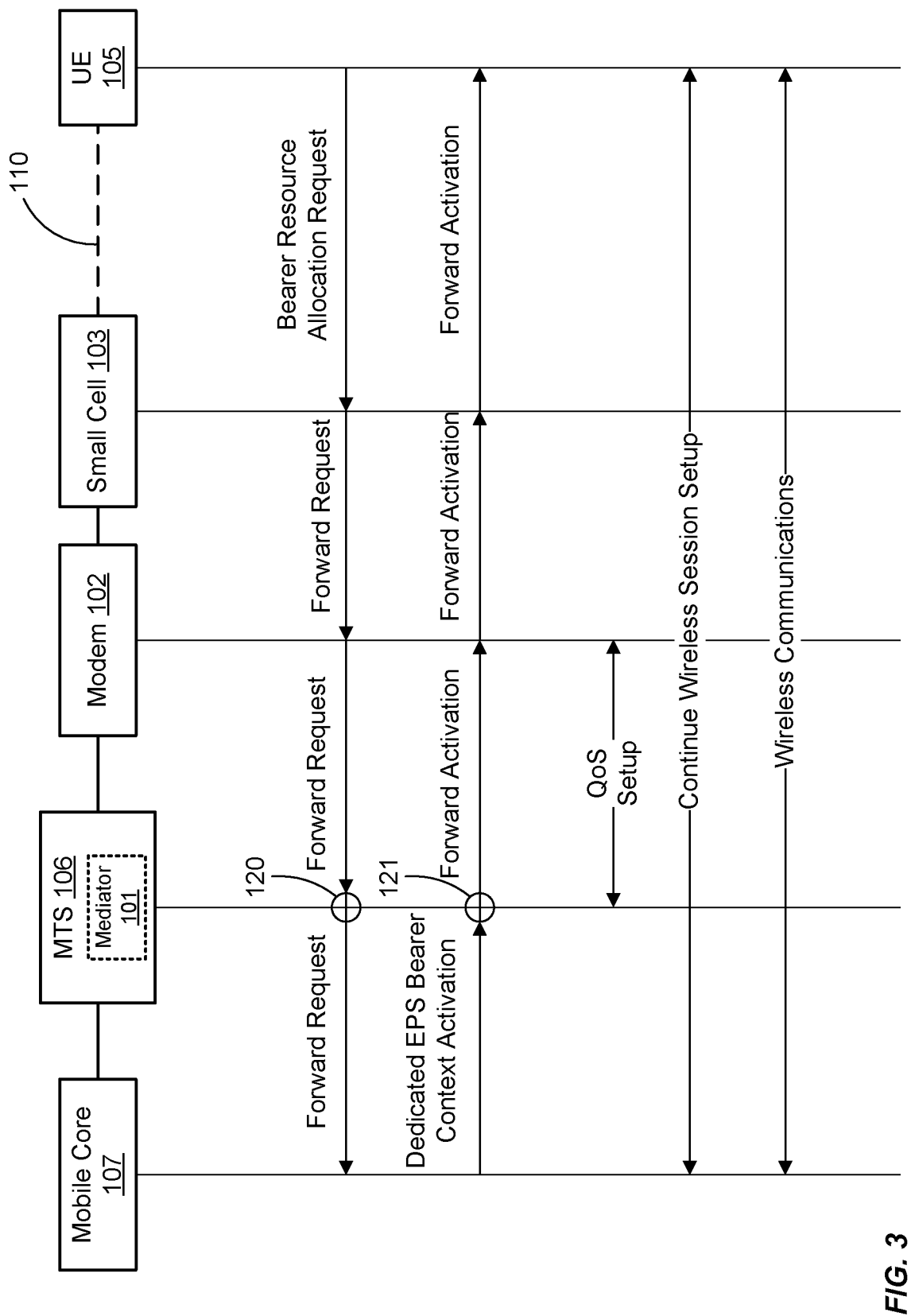
FIG. 3 is an exemplary communication diagram of the wireless service link of FIG. 1.

FIG. 3 is an exemplary communication diagram of the wireless service link of FIG. 1. In this embodiment, the small cell 103 communicates with the UE 105 over the air-to-air interface 110 via a wireless protocol. Thus, when the UE 105 communicates with the mobile core 107, the UE 105 communicates via the wireless protocol.

When the UE 105 launches an application, the application may request a new wireless session through the mobile core 107. Accordingly, the UE 105 transfers a bearer resource allocation request to the mobile core 107 via the small cell 103. The small cell 103 forwards the request to the modem 102. The modem 102 forwards the request onto the MTS 106 over the communication link. The MTS 106 or an associated mediator 101 (e.g., via the functionality of the CSS 104) may intercept the request (element 120) and recognize it as a bearer resource allocation request from the UE 105. This would allow the MTS 106 or the associated mediator 101, independently or cooperatively, to prepare for a response from the mobile core 107 indicating that is about to establish a wireless session with the UE 105.

The MTS 106 or the associated mediator 101 (e.g., via the functionality of the CSS 104), independently or cooperatively, forwards the request to the mobile core 107 and waits for the associated response. When the mobile core 107 transfers a dedicated bearer context activation (e.g., a Evolved Packet System (EPS) bearer context activation), the MTS 106 intercepts that activation message (element 121) and processes all or a portion of the message to access to determine that the mobile core 107 is establishing a wireless session with the UE 105. Accordingly, the MTS 106 extracts activation message data, such as but not limited to the QoS parameters, from the activation message. The MTS 106 does this to establish, for example, the same or compatible QoS parameters with the communication session between the MTS 106 and the modem 102. Then, the MTS 106 establishes a communication session between the MTS 106 and the modem 102 (e.g., via a DOCSIS Dynamic Service Flow (DSx) message), as well as forwards the activation message to the small cell 103, which in turn forwards it to the UE 105. Thus, the MTS 106 establishes the setup of communication session after or substantially at the same time the wireless session is finalized. Once the wireless session is established, wireless communications can commence between the UE 105 and the mobile core 107 because the communication session between the MTS 106 and the modem 102 has already been established.

Figure 4:
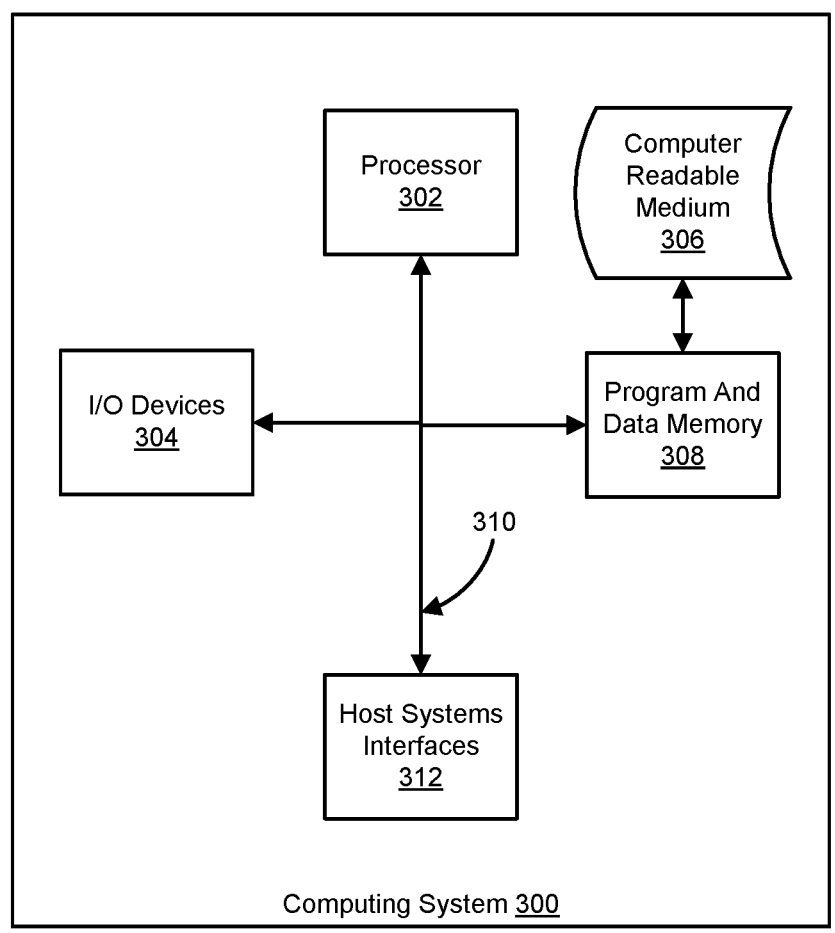
FIG. 4 is a block diagram of an exemplary computing system in which a computer readable medium provides instructions for performing methods herein.

The invention can take the form of an entirely hardware embodiment, an entirely software embodiment or an embodiment containing both hardware and software elements. Embodiments utilizing network functions virtualization (NFV) and virtualized hardware, such as a virtualized MTS, modem, etc., are also contemplated. In one embodiment, the invention is implemented in whole or in part in software, which includes but is not limited to firmware, resident software, microcode, etc. FIG. 4 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems and Ethernet cards are just a few of the currently available types of network adapters.

Figure 5:
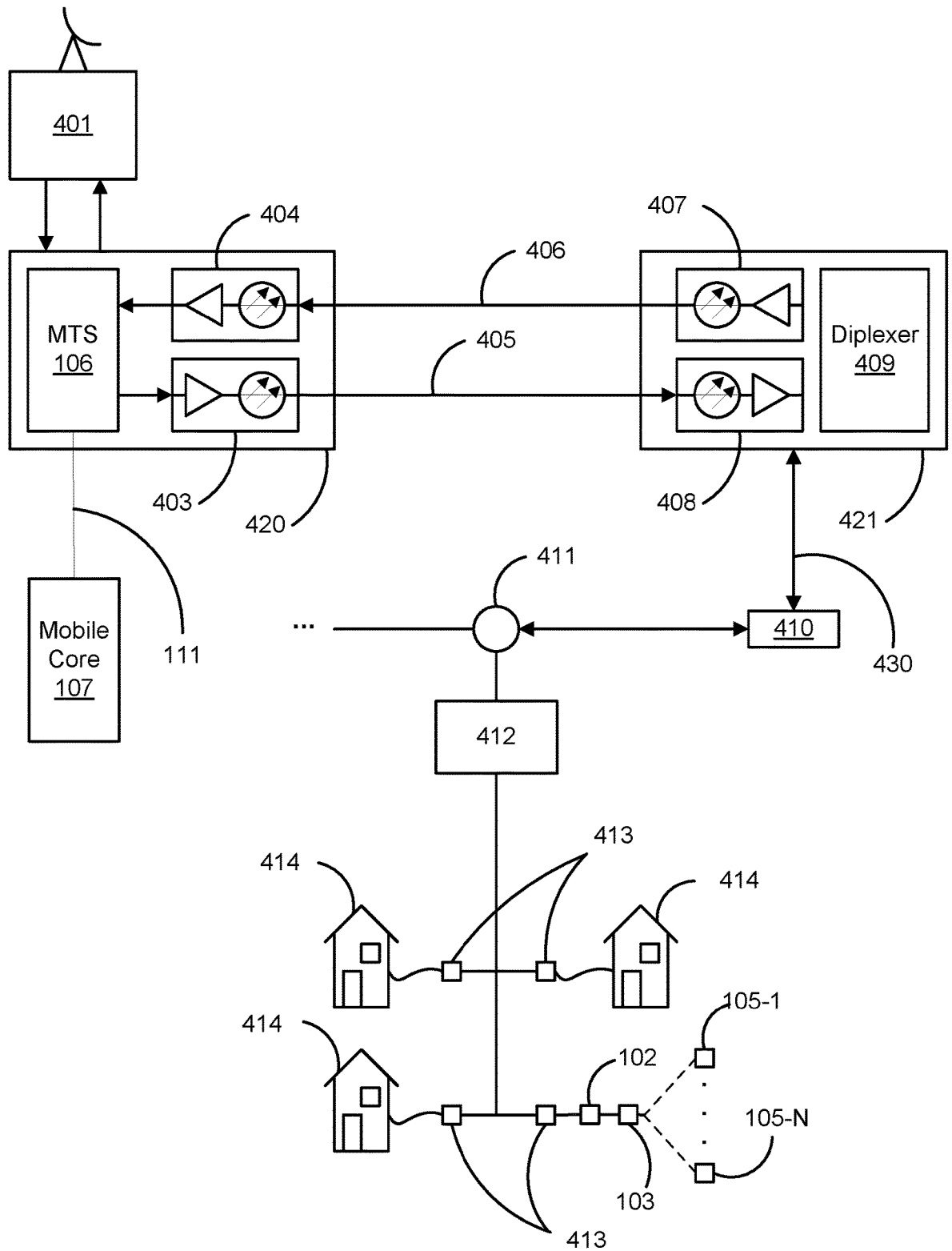
FIG. 5 is a block diagram of a communication system operable to implement the embodiments herein.

FIG. 5 is a block diagram of an exemplary system operable to provide wireless service for a plurality of UEs 105-1-105-N (where "N" is simply intended to represent an integer greater than "1" and not necessarily equal to any other "N" reference designated herein). For example, upstream and downstream links of the exemplary communication system offers high speed data services over connected devices, such as the modem 102. The modem 102 may be configured with or receive communications from the small cell 103 so as to allow the UEs 105 to communicate through the communication system in a manner that is transparent to the user.

The communication system includes a communication component 401 configured with an upstream hub 420. The hub 420 is coupled to a fiber node 421 via optical communication links 405 and 406. The hub 420 includes an MTS 106, an electrical to optical converter 403, and an optical to electrical converter 404. The node 421 is similarly configured with an optical to electrical converter 408 and an electrical to optical converter 407.

The communication component 401 is the source for various communication signals. Antennas may receive communication signals that are converted as necessary and transmitted over fiber optic cables 405 to the hub 420. Several hubs may be connected to a single communication component 401 and the hub 420 may each be connected to several nodes 421 by fiber optic cable links 405 and 406. The MTS 106 may be configured in the communication component 401 or in the hub 420.

Downstream, such as in homes/businesses, are devices that operate as data terminals. These data terminals are modems. A modem can acts as a host for an Internet Protocol (IP) device such as personal computer. However, the modem can be configured with a small cell so as to provide wireless services through the system for the UEs 105-1-105-N.

In this embodiment, transmissions from the MTS 106 to the modem 102 are carried over the downstream portion of the communication system generally in the band between 54 MHz and 3 GHz, for example. Downstream digital transmissions are continuous and are typically monitored by many modems. Upstream transmissions from the modems to the MTS 106 are, for example, typically carried in the 5-600 MHz frequency band, the upstream bandwidth being shared by the Modems that are on-line. However, with greater demands for data, additional frequency bands and bandwidths are continuously being deployed in the downstream and upstream paths. It is also possible that modems 102 and the MTS 106 engage in full duplex transmission modes, whereby concurrent transmissions on the upstream and the downstream over the same frequency is supported. Equivalent communications and protocols for fiber optic transmissions are also contemplated, for example, using an optical network terminal (ONT) or optical line termination (OLT), and an optical network unit (ONU), and equivalent protocols such as EPON, RFOG, or GPON.

The MTS 106 connects the system to the Internet backbone. The MTS 106 connects to the downstream path through an electrical to optical converter 403 that is connected to the fiber optic cable 405, which in turn, is connected to an optical to electrical converter 408 at the node 421. The signal is transmitted to a diplexer 409 that combines the upstream and downstream signals onto a single cable. The diplexer 409 allows the different frequency bands to be combined onto the same cable.

After the downstream signal leaves the node 421, the signal is typically carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/headend 401 occur by passing through the same coaxial cable 430 as the downstream signals, in the opposite direction on a different frequency band. The upstream signals are sent typically utilizing Quadrature Amplitude Modulation (QAM) with forward error correction. The upstream signals can employ QPSK or any level of QAM, including 8 QAM, 32 QAM, 64 QAM, 128 QAM, 256 QAM, 512 QAM, 1024 QAM, and 4096 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Upstream transmissions, in this embodiment, can be sent in a frequency/time division multiplexing access (FDMA/TDMA) scheme, or Orthogonal Frequency Division Multiple Access (OFDMA). The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 406 and received by optical to electrical converter 404 in the node 420. The fiber optic links 405 and 406 are typically driven by laser diodes, such as Fabry Perot and distributed feedback laser diodes.

Figure 6:
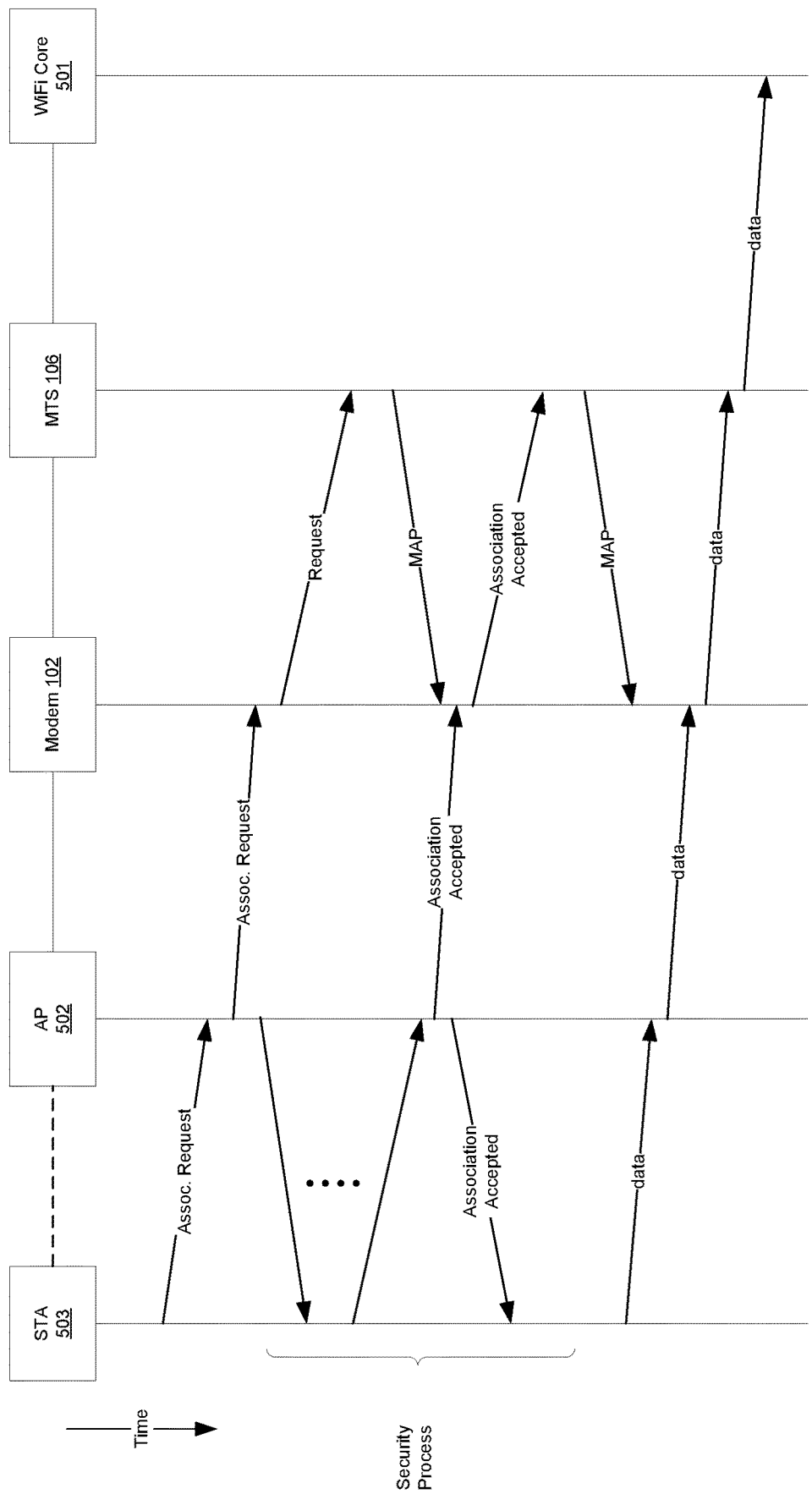
FIG. 6 is an exemplary communication diagram of the wireless service link employing Wi-Fi.

FIG. 6 is an exemplary communication diagram of the wireless service link employing Wi-Fi. In FIG. 6, the communication diagram is illustrated as part of a Wi-Fi association setup. In this regard, the communication link established between the modem 102 and the MTS 106 interfaces with a Wi-Fi core 501 as well as an access point (AP) 502 (e.g., wireless access point or "WAP"). The AP 502 communicates with a Wi-Fi station (STA) 503 such that the STA 503 can transmit data to the Wi-Fi core 501.

When the STA 503 needs to transmit data to the Wi-Fi core 501, the STA 503 issues an "association request" to the AP 502. The AP 502 transfers the association request to the modem 102 which, in turn, issues a request to the MTS 106 to transfer data. The MTS 106 transfers a MAP (or some other granting mechanism) to the modem 102 granting the modem 102 a data transfer. At or about the same time, the AP 502 communicates with the STA 503 as part of a security process until the AP 502 accepts the association with the STA 503.

When the AP 502 accepts the association with the STA 503, the AP 502 forwards the accepted association to the modem 102 such that it may transfer the accepted association to the MTS 106. The MTS 106 transfers a MAP (or some other granting mechanism) to the modem 102 such that it can prepare for the data from the STA 503. And, when the STA 503 receives the accepted association from the AP 502, the STA 503 begins to transfer its data. As the communication link between the modem 102 and the MTS 106 has already been established, the AP 502 can simply transfer the data to the Wi-Fi core 501 through the granted communication link between the modem 102 and the MTS 106.

Figure 7:
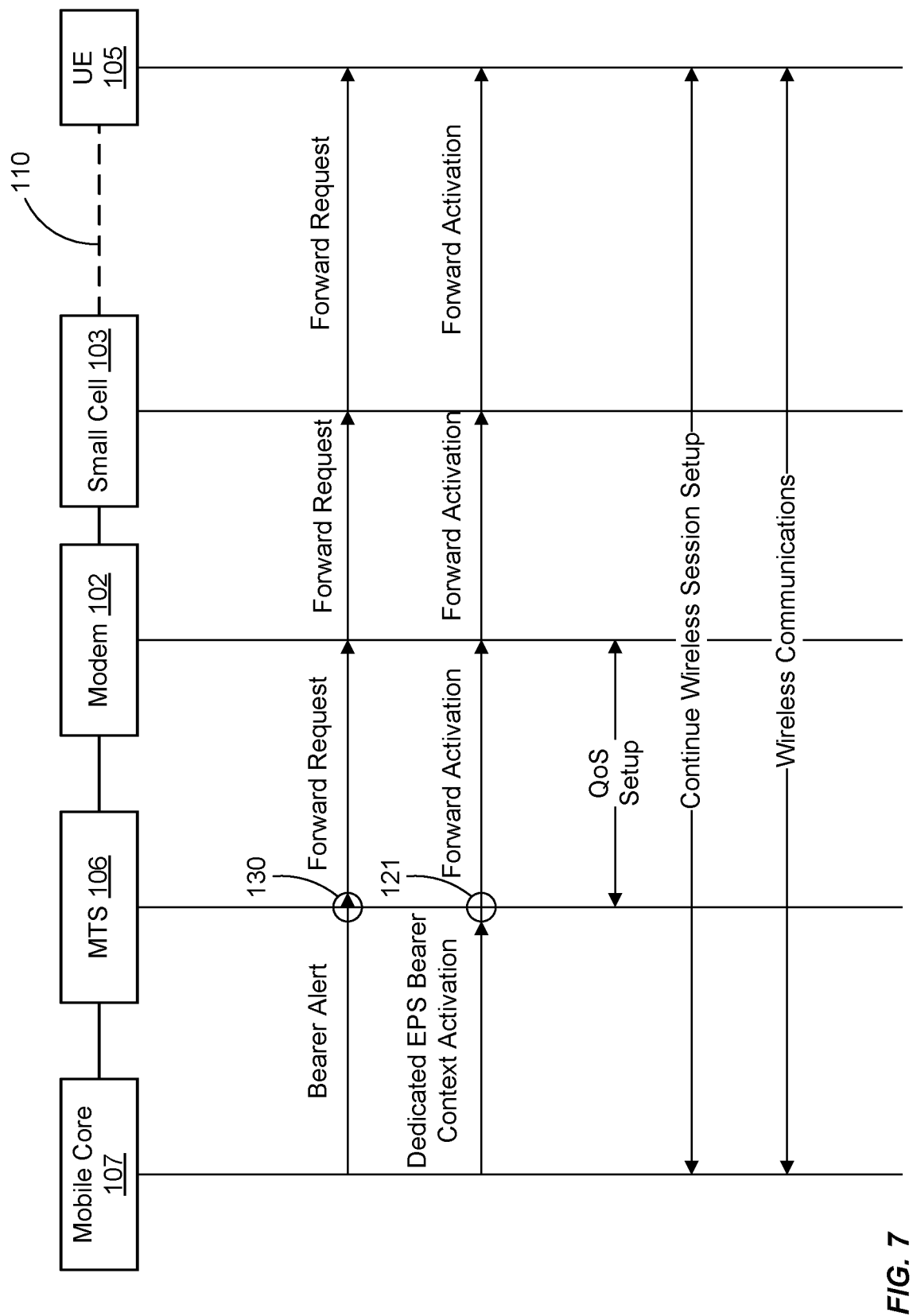
FIG. 7 is an exemplary communication diagram of the wireless service link of FIG. 1 illustrating a network initiated session.

FIG. 7 is an exemplary communication diagram of the wireless service link of FIG. 1 illustrating a network initiated session. In this embodiment, the mobile core 107 transfers a bearer alert to the MTS 106. The MTS 106 may intercept the alert (element 130) and recognize it as a network initiated bearer alert for the UE 105. This would allow the MTS 106 to prepare to respond to the impending wireless session establishment by preparing to set up a communication session on between the MTS 106 and the modem 102. The MTS 106 then transfers the alert to the UE 105 through the modem 102 and the small cell 103. Again, the small cell 103 communicates with the UE 105 over the air-to-air interface 110 via a wireless protocol. Thus, when the UE 105 communicates with the mobile core 107, the UE 105 communicates via the wireless protocol. From there, the mobile core 107 transfers a dedicated bearer context activation (e.g., a Evolved Packet System (EPS) bearer context activation), the MTS 106 intercepts that activation message (element 121) and understands that the mobile core 107 is establishing a wireless session with the UE 105, and in turn, initiates a session setup on the communication link (e.g., via DSx for DOCSIS). The communications continue as with that shown and described in FIG. 3.

What is claimed is:

1. A system, comprising:
a communication session setup (CSS) interceptor configured to monitor a request for a wireless session of a user equipment (UE) from a modem to a mobile core servicing the UE; and
a communication session setup (CSS) processor configured to examine setup information for the wireless session from the mobile core in response to the request, to initiate a communication session between the modem and a Modem Termination System (MTS) based on the intercepted setup information, and to facilitate a transmission of the wireless session through the communication session substantially in parallel to the mobile core completing setup of the wireless session with the UE;
wherein the UE and the mobile core communicate via a first protocol and the modem and MTS communicate via a second protocol different from the first protocol.

2. The system of claim 1, wherein:
at least one of the CSS interceptor and the CSS processor is configured with the MTS.

3. The system of claim 1, wherein:
at least one of the CSS interceptor and the CSS processor is configured with a mediator in communication with the MTS.

4. The system of claim 1, wherein:
the setup information comprises an Evolved Packet System (EPS) bearer activation for the wireless session establishing Quality of Service (QoS) parameters for the wireless session of the UE.

5. The system of claim 4, wherein:
the CSS processor is further configured to intercept the QoS parameters of the EPS bearer activation, and to use the QoS parameters for the communication session.

6. The system of claim 4, wherein:
the QoS parameters comprise a QoS Class Identifier (QCI), an Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, or a combination thereof.

7. The system of claim 1, wherein:
the mobile core is configured to communicate with another UE through an eNodeB via a Long Term Evolution (LTE) protocol.

8. The system of claim 1, wherein:
the CSS processor is further configured to communicate with the modem via a Data Over Cable Service Interface Specification (DOCSIS) protocol.

9. The system of claim 8, wherein:
the CSS processor is further configured to initiate the communication session with the modem using Dynamic Service Flow (DSx) messaging of the DOCSIS protocol.

10. The system of claim 1, wherein:
the setup information comprises a network initiated bearer alert for the wireless session establishing Quality of Service (QoS) parameters for the wireless session of the UE.

11. A method, comprising:
monitoring a request for a wireless session of a user equipment (UE) from a modem to a mobile core servicing the UE;
examining setup information for the wireless session from the mobile core in response to the request;
initiating a communication session between the modem and a Modem Termination System (MTS) based on the setup information; and
facilitating a transmission of the wireless session through the communication session when the mobile core completes setup of the wireless session with the UE;
wherein the UE and the mobile core communicate via a first protocol and the modem and MTS communicate via a second protocol different from the first protocol.

12. The method of claim 11, wherein:
the setup information comprises an Evolved Packet System (EPS) bearer activation for the wireless session establishing Quality of Service (QoS) parameters for the wireless session of the UE.

13. The method of claim 12, further comprising:
intercepting the QoS parameters of the EPS bearer activation; and
using the QoS parameters for the communication session.

14. The method of claim 12, wherein:
the QoS parameters comprise a QoS Class Identifier (QCI), an Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, or a combination thereof.

15. The method of claim 11, wherein:
the mobile core is configured to communicate with another UE through an eNodeB via a Long Term Evolution (LTE) protocol.

16. The method of claim 11, further comprising:
communicating with the modem via a Data Over Cable Service Interface Specification (DOCSIS) protocol.

17. The method of claim 16, further comprising:
initiating the communication session with the modem using Dynamic Service Flow (DSx) messaging of the DOCSIS protocol.

18. The method of claim 11, wherein:
the setup information comprises a network initiated bearer alert for the wireless session establishing Quality of Service (QoS) parameters for the wireless session of the UE.

19. A non-transitory computer readable medium embodying programmed instructions which, when executed by a processor, direct the processor to:
- monitor a request for a wireless session of a user equipment (UE) from a modem to a mobile core servicing the UE;
- examine setup information for the wireless session from the mobile core in response to the request;
- initiate a communication session between the modem and a Modem Termination System (MTS) based on the setup information; and
- facilitate a transmission of the wireless session through the communication session when the mobile core completes setup of the wireless session with the UE;
- wherein the UE and the mobile core communicate via a first protocol and the modem and MTS communicate via a second protocol different from the first protocol.

20. The non-transitory computer readable medium of claim 19, wherein:
- the setup information comprises an Evolved Packet System (EPS) bearer activation for the wireless session establishing Quality of Service (QoS) parameters for the wireless session of the UE.

21. The non-transitory computer readable medium of claim 20, wherein the programmed instructions further direct the processor to:
- intercept the QoS parameters of the EPS bearer activation; and
- use the QoS parameters for the communication session.

22. The non-transitory computer readable medium of claim 20, wherein:
- the QoS parameters comprise a QoS Class Identifier (QCI), an Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, or a combination thereof.

23. The non-transitory computer readable medium of claim 19, wherein:
- the mobile core is configured to communicate with another UE through an eNodeB via a Long Term Evolution (LTE) protocol.

24. The non-transitory computer readable medium of claim 19, wherein the programmed instructions further direct the processor to:
- communicate with the modem via a Data Over Cable Service Interface Specification (DOCSIS) protocol.

25. The non-transitory computer readable medium of claim 24, wherein the programmed instructions further direct the processor to:
- initiate the communication session with the modem using Dynamic Service Flow (DSx) messaging of the DOCSIS protocol.

26. The non-transitory computer readable medium of claim 19, wherein:
- the setup information comprises a network initiated bearer alert for the wireless session establishing Quality of Service (QoS) parameters for the wireless session of the UE.

* * * * *